US012498111B1

(12) United States Patent
Zou

(10) Patent No.: US 12,498,111 B1
(45) Date of Patent: Dec. 16, 2025

(54) TREE-SHAPED LIGHT SECTION AND TREE-SHAPED LIGHT

(71) Applicant: Xinjiang Zou, Meizhou (CN)

(72) Inventor: Xinjiang Zou, Meizhou (CN)

( * ) Notice: Subject to any disclaimer, the term of this patent is extended or adjusted under 35 U.S.C. 154(b) by 0 days.

(21) Appl. No.: 18/963,315

(22) Filed: Nov. 27, 2024

(30) Foreign Application Priority Data

Oct. 29, 2024 (CN) ......................... 202422634072.3

(51) Int. Cl.

| | |
|---|---|
| ***F21V 23/06*** | (2006.01) |
| ***F21V 23/00*** | (2015.01) |
| ***H01R 13/24*** | (2006.01) |
| ***H01R 13/627*** | (2006.01) |

(52) U.S. Cl.

CPC ............ *F21V 23/06* (2013.01); *F21V 23/002* (2013.01); *H01R 13/2421* (2013.01); *H01R 13/6272* (2013.01)

(58) Field of Classification Search

CPC ............ F21S 4/10; A47G 33/12; A47G 33/06

See application file for complete search history.

(56) References Cited

U.S. PATENT DOCUMENTS 11,641,968 B1 * 5/2023 Zou ...................... A47G 33/126 362/249.14

2013/0301246 A1 * 11/2013 Chen ...................... F21V 23/02 362/123

2014/0268689 A1 * 9/2014 Chen ...................... H01R 33/92 29/876

OTHER PUBLICATIONS

Innovation Q+ NPL Search (Year: 2025).*

* cited by examiner

*Primary Examiner* — Anabel Ton

(57) ABSTRACT

A tree-shaped light section comprising a first tube body, a second tube body, and an electrical connection assembly, wherein the electrical connection assembly comprises a pin, a circuit board, a first electrical connection seat, a second electrical connection seat, a first connector, and a second connector, the first connector is mounted within one end of the first tube body, the second connector is mounted within one end of the second tube body facing the first tube body, the first connector is detachably connected to the second connector so that the first tube body is detachably connected to the second tube body, the pin is mounted in the first connector and electrically connected to the first electrical connection seat, the circuit board is mounted in the second connector and electrically connected to the second electrical connection seat, the pin has a spring, and the pin is pressed against the circuit board.

18 Claims, 9 Drawing Sheets

TREE-SHAPED LIGHT SECTION AND TREE-SHAPED LIGHT

CROSS-REFERENCE TO RELATED APPLICATIONS

The application claims priority of Chinese patent application CN2024226340723, filed on Oct. 29, 2024, which is incorporated herein by reference in its entireties.

FIELD

The present application relates to the field of light, specifically to a tree-shaped light section and a tree-shaped light.

BACKGROUND

For an existing tree-shaped light, because a line is usually disposed on the outer side of a tree, a connecting wire of the tree-shaped light is often exposed to an environment and the field of vision of a surrounding person, which leads to the connecting wire of the light being easily affected by the environment, such as moisture or damage. Therefore, the connecting wire of the light has an unstable situation. Further, the tree-shaped light is not so beautiful and can not achieve a decorative effect. The tree-shaped lights need to assemble a circuit part separately, which is not easy to assemble but also time-consuming and costly.

SUMMARY

This summary introduces a number of concepts in a simplified form that will be further described in the following detailed description. This summary is not intended to identify key or essential aspects of a requested subject matter. Further, this summary is not intended to be used as an aid in determining the scope of the subject matter of claims.

In one aspect, the present application provides a tree-shaped light section, including a first tube body, a second tube body, and an electrical connection assembly. The electrical connection assembly includes a pin, a circuit board, a first electrical connection seat, a second electrical connection seat, a first connector and a second connector. The first connector is mounted within one end of the first tube body. The second connector is mounted within one end of the second tube body facing the first tube body. The first connector is detachably connected to the second connector so that the first tube body is detachably connected to the second tube body. The pin is mounted in the first connector and electrically connected to the first electrical connection seat. The circuit board is mounted in the second connector and electrically connected to the second electrical connection seat. The pin has a spring. The pin is pressed against the circuit board.

In another aspect, the present application provides a tree-shaped light section, including a first tube body, a second tube body, and an electrical connection assembly. The electrical connection assembly includes a first electrical connection structure, a second electrical connection structure, a first electrical connection seat, a second electrical connection seat, a first connector, and a second connector. The first connector is mounted within one end of the first tube body. The second connector is mounted within one end of the second tube body facing the first tube body. The first connector is detachably connected to the second connector so that the first tube body is detachably connected to the second tube body. The first electrical connection structure is mounted in the first connector and electrically connected to the first electrical connection seat. The second electrical connection structure is mounted in the second connector and electrically connected to the second electrical connection seat. The first electrical connection structure has a spring. The first electrical connection structure is pressed against the second electrical connection structure under the action of the spring.

In another aspect, the present application provides a tree-shaped light, including at least one tree-shaped light section and a base. The tree-shaped light section is mounted on the base after being assembled. The tree-shaped light section includes a first tube body, a second tube body, and an electrical connection assembly. The electrical connection assembly includes a first electrical connection structure, a second electrical connection structure, a first electrical connection seat, a second electrical connection seat, a first connector, and a second connector. The first connector is mounted within one end of the first tube body. The second connector is mounted within one end of the second tube body facing the first tube body. The first connector is detachably connected to the second connector so that the first tube body is detachably connected to the second tube body. The first electrical connection structure is mounted in the first connector and electrically connected to the first electrical connection seat. The second electrical connection structure is mounted in the second connector and electrically connected to the second electrical connection seat. The first electrical connection structure has a spring. The first electrical connection structure is pressed against the second electrical connection structure under the action of the spring.

The above aspects or examples and advantages, as well as other aspects or examples and advantages will be apparent from the following description and accompanying drawings.

BRIEF DESCRIPTION OF THE DRAWINGS

The accompanying drawings are for exemplary illustration only and are not to be construed as a limitation of the present patent. The same reference signs are used for structurally identical and functionally identical members. In the drawings.

Figure 1:
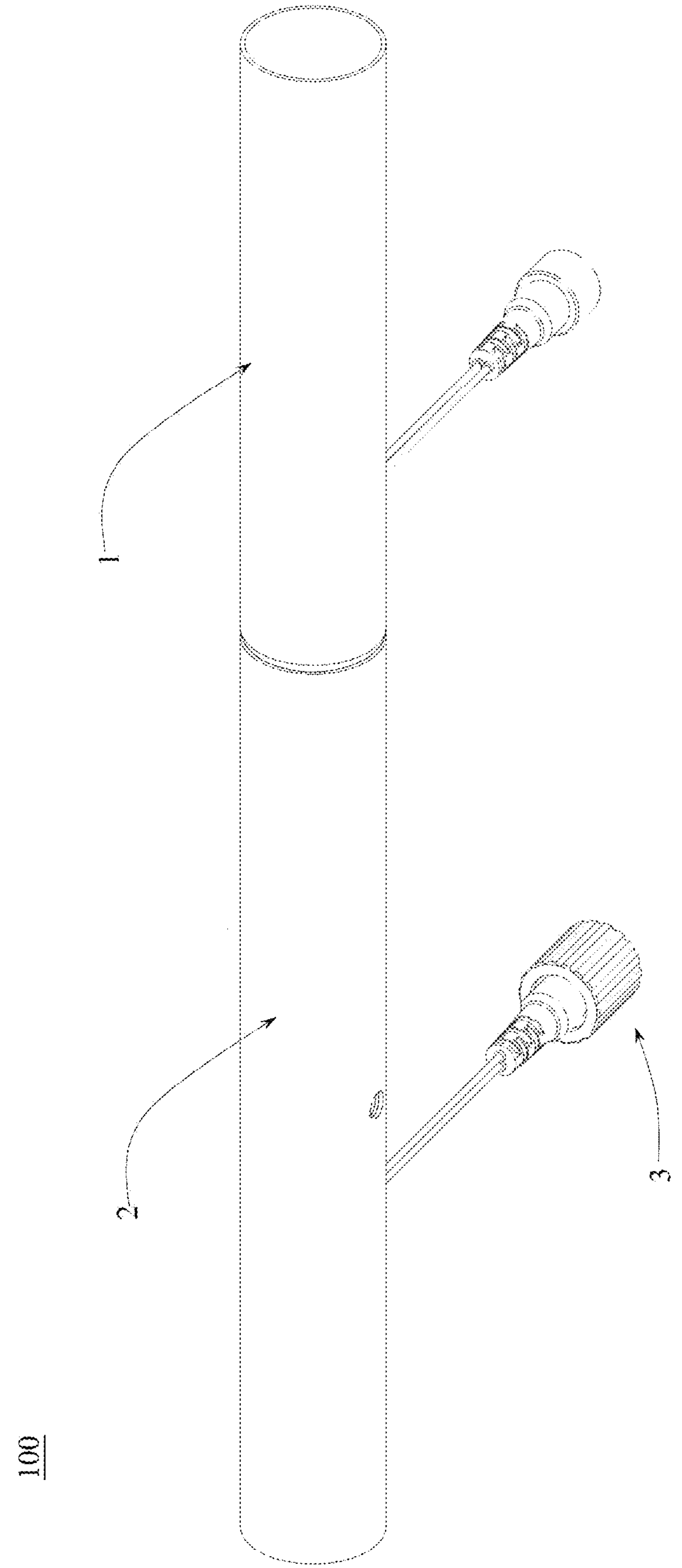
FIG. 1 shows a schematic diagram of an overall structure of a tree-shaped light section of an embodiment of the present invention.

Descriptions of the reference signs:

Tree-shaped light section 100;

First tube body 1;
Fifth through hole 11;
Third through hole 12;
Second tube body 2;
Fourth through hole 21;
Third step 22;
First through hole 23;
Tube body thin portion 24;
Tube body thick portion 25;
Electrical connection assembly 3;
First connector 31;
Third protrusion 3101;
Second protrusion 3102;
First connecting structure 3103;
First housing 3104;
Second housing 3105;
First step 3106;
First groove 3107;
Stop 31071;
second through hole 3108;
Mounting hole of circuit board 3109;
First wire-crossing hole 31010;
First end board 31011;
Second connector 32;
Second wire-crossing hole 3201;
Rib board 32010;
Second end board 32011;
Insertion hole 32012;
First wire-crossing slot 3202;
First mounting hole 3203;
Second mounting hole 3204;
Second connecting structure 3205;
Third housing 3206;
Fourth housing 3207;
First snap joint 3208;
Elastic board 32081;
First protrusion 32082;
Second step 3209;
First electrical connection seat 33;
Lead wire 34;
Pin 35;
Tail 351;
Spring 352;
Head 353;
Circuit board 36;
Negative electrode portion 361;
Positive electrode portion 362;
Second electrical connection seat 37.

DETAILED DESCRIPTION OF EMBODIMENTS

The technical solutions in the embodiments of the present application will be described below in connection with the accompanying drawings in the embodiments of the present invention. In the description of the embodiments of the present invention, unless otherwise specified, "/" means "or", for example, A/B may mean A or B. "And/or" herein is merely a description of the association relationship of an associated object, indicating that three relationships may exist. For example, A and/or B can mean: A alone, both A and B, and B alone. Further, in the description of embodiments of the present invention, "more than one" means two or more than two.

Hereinafter, the terms "first" and "second" are used only for descriptive purposes, and are not to be understood as indicating or implying relative importance or implicitly specifying the number of the indicated technical features. Thus, a feature defined with "first" and "second" may expressly or implicitly include one or more such features.

In the description of this embodiment, unless otherwise specified, "more than one" means two or more.

Figure 2:
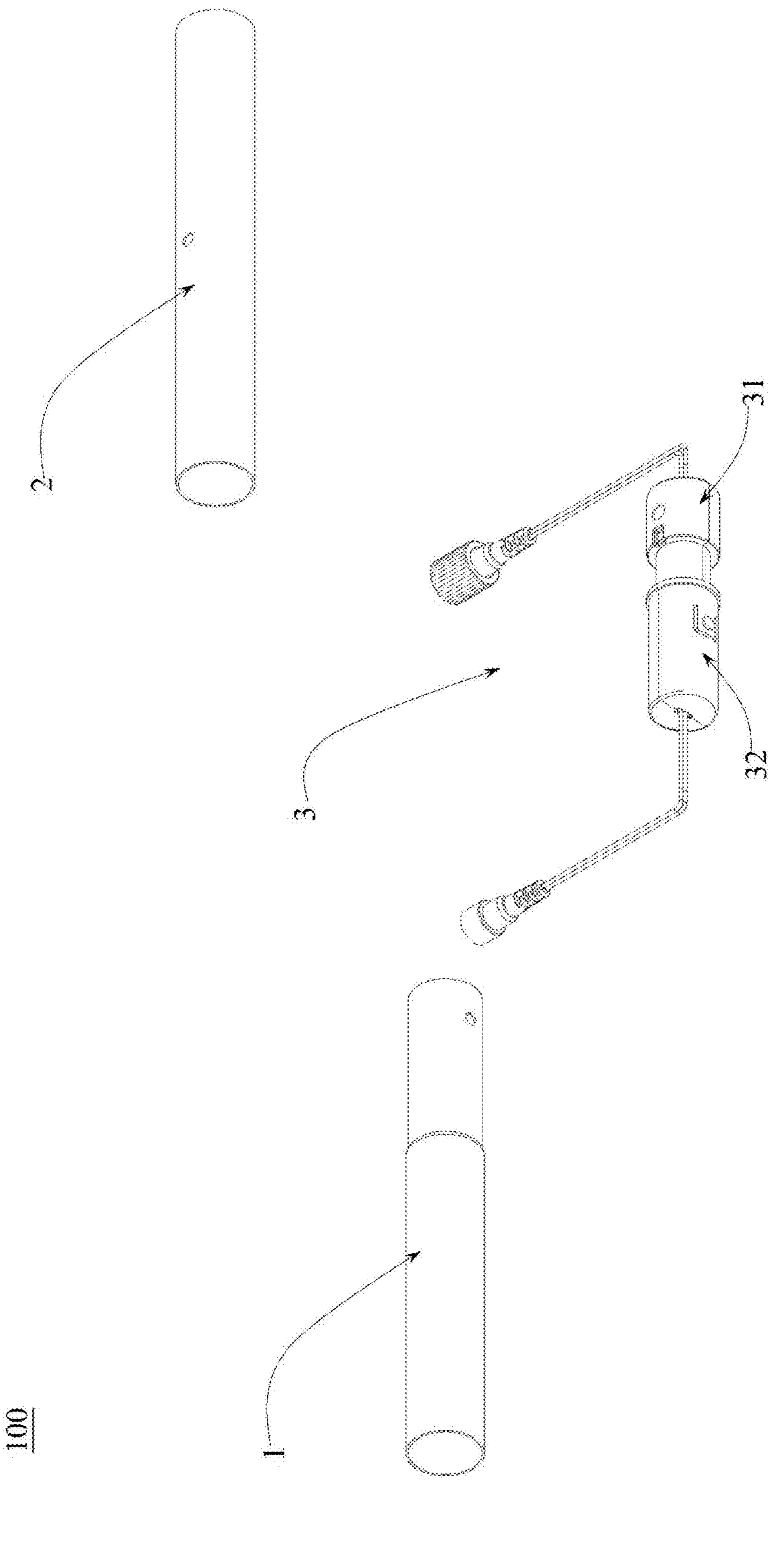
FIG. 2 shows a schematic diagram of a decomposed structure of a tree-shaped light section shown in FIG. 1.
Figure 3:
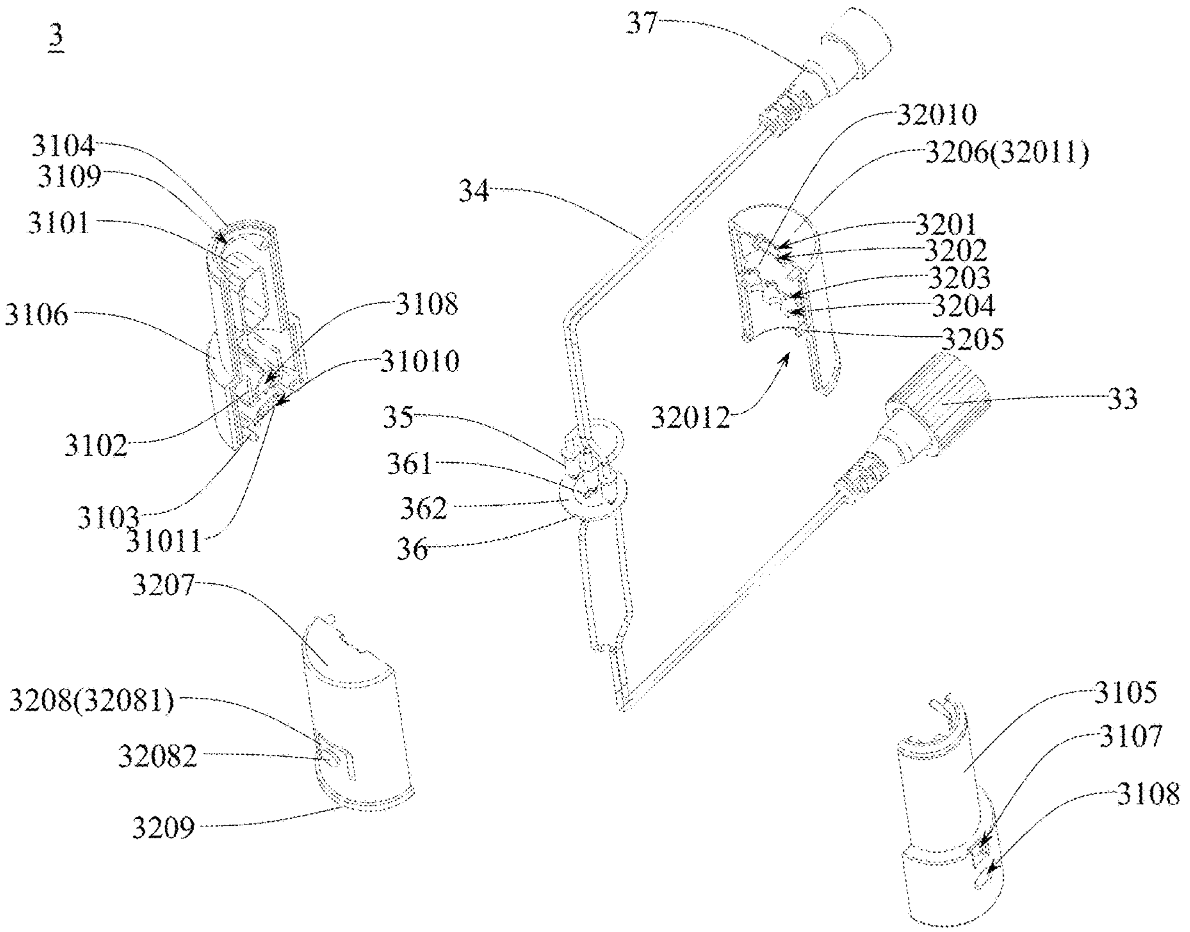
FIG. 3 shows a schematic diagram of a decomposed structure of an electrical connection assembly shown in FIG. 1.

Referring to FIGS. 1-3, the present application provides a tree-shaped light section 100. Exemplarily, the tree-shaped light section 100 includes a first tube body 1, a second tube body 2, and an electrical connection assembly 3. The first tube body 1 is detachably connected to the second tube body 2. The electrical connection assembly 3 is disposed inside the first tube body 1 and the second tube body 2.

The electrical connection assembly 3 includes a first connector 31 and a second connector 32. The first connector 31 is mounted within one end of the first tube body 1. The second connector 32 is mounted within one end of the second tube body 2 facing the first tube body 1. The first connector 31 is detachably connected to the second connector 32, so that the first connector 31 is detachably connected to the second connector 32.

The electrical connection assembly 3 further includes a lead wire 34, a first electrical connection structure, a second electrical connection structure, a first electrical connection seat 33, and a second electrical connection seat 37. The first electrical connection, seat 33, is positioned outside the first tube body 1. The second electrical connection, seat 37, is positioned outside the second tube body 2. The second electrical connection structure is mounted in the first connector 31 and electrically connected to the first electrical connection seat 33 by means of the lead wire 34 passing through the first tube body 1. The first electrical connection structure is mounted in the second connector 32 and electrically connected to the second electrical connection seat 37 by means of the lead wire 34 passing through the second tube body 2.

In this embodiment, the first electrical connection structure is a pin 35. In some embodiments, the first electrical connection structure can also be a contact, a plug, and the like.

In this embodiment, the second electrical connection structure is a circuit board 36. In some embodiments, the second electrical connection structure can also be the contact, a socket, and the like.

Figure 6:
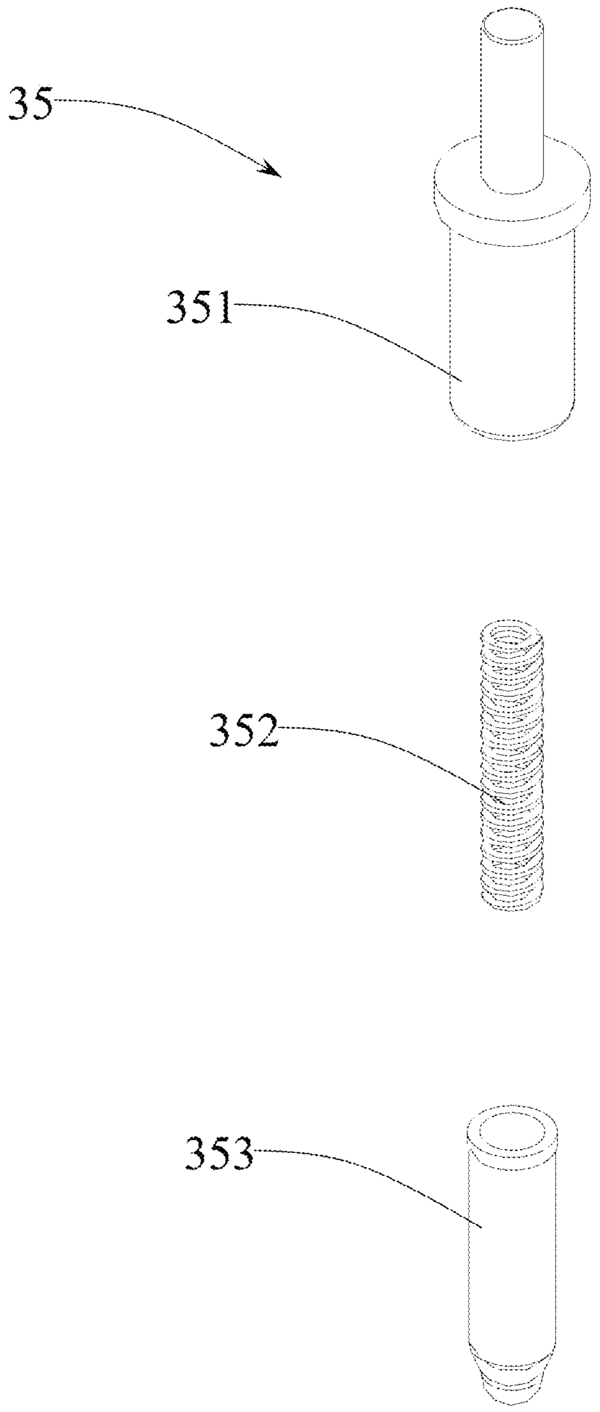
FIG. 6 is a schematic diagram of an overall structure of a pin shown in FIG. 3.

Referring to FIG. 6, the pin 35 includes a head 353 facing the circuit board 36 and a tail 351 away from the circuit board 36. The head 353 is movably connected to the tail 351. A spring 352 is connected between the head 353 and the tail 351. The head 353 is movable with respect to the tail 351 under an external force while driving the spring 352 to stretch or compress.

Figure 4:
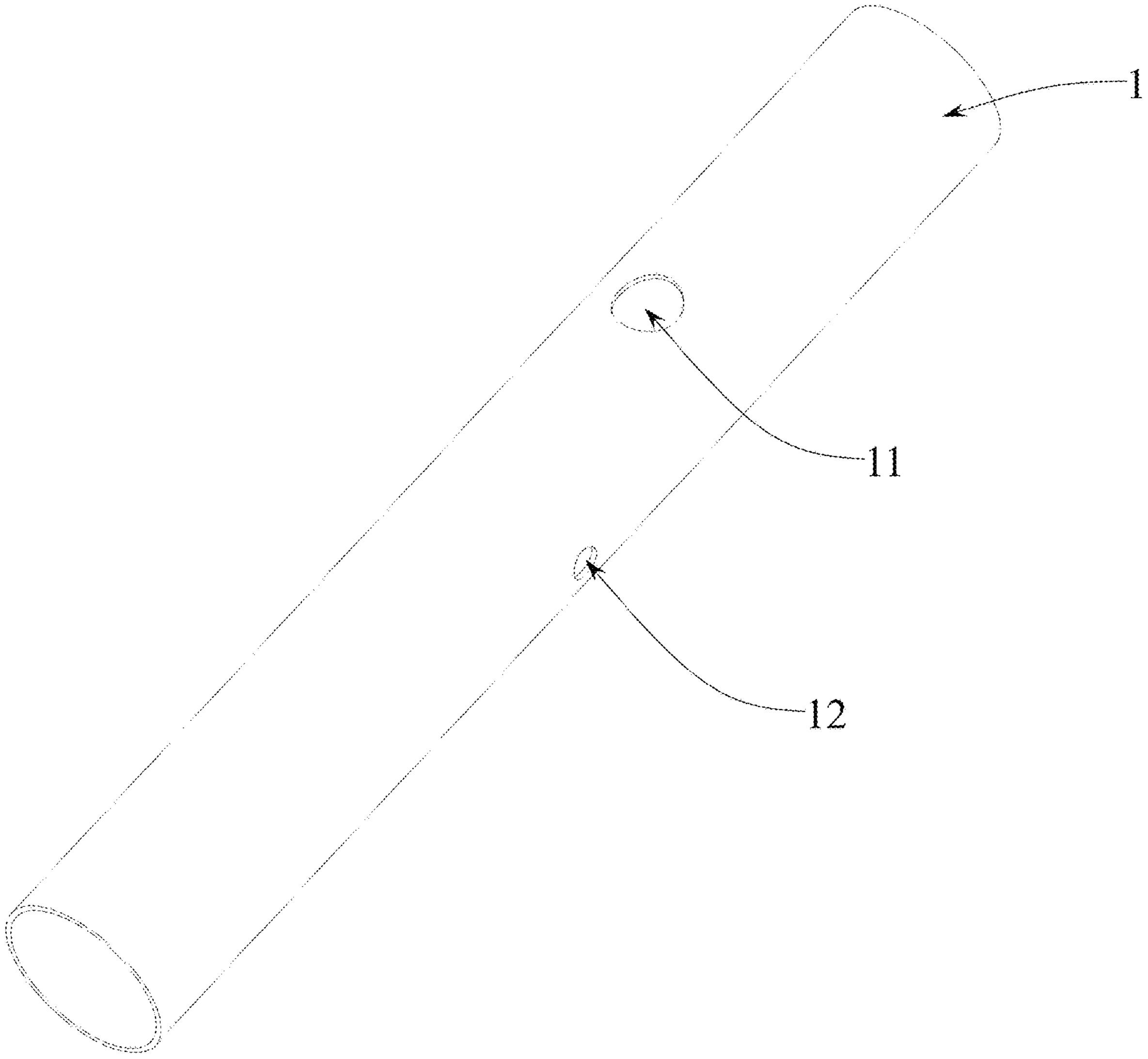
FIG. 4 is a schematic diagram of an overall structure of a first tube body shown in FIG. 1.

Referring to FIGS. 3 and 4, the first tube body 1 has a tube cavity. The first connector 31 is mounted in the tube cavity of the first tube body 1. The first connector 31 has an inner cavity. The two inner walls of the lead wire 34 corresponding to the inner cavity of the first connector 31 protrude inwardly to form a third protrusion 3101 and a second protrusion 3102. A mounting hole 3109 of the circuit board is formed on the side of the first tube body 1 toward the second connector 32. The circuit board 36 is snap-fitted into the mounting hole 3109 of the circuit board so that the circuit board 36 is mounted in the first connector 31. A first end board 31011 is disposed on the side of the first tube body 1 away from the second connector 32. A first wire-crossing hole 31010 is formed on the inwardly facing side of the first end board 31011. The first tube body 1 also includes a fifth through hole 11. One end of the lead wire 34 is electrically connected to the circuit board 36, and the other end of the lead wire 34 is looped around the third protrusion 3101 and the second protrusion 3102, respectively, to reduce the risk of the lead wire 34 being pulled and disconnected. The other end of the lead wire 34 passes through the first wire-crossing hole 31010 and the fifth through hole 11 in sequence after coming around the second protrusion 3102 and extends to the outer side of the first tube body 1 to be electrically connected to the first electrical connection seat 33.

Figure 5:
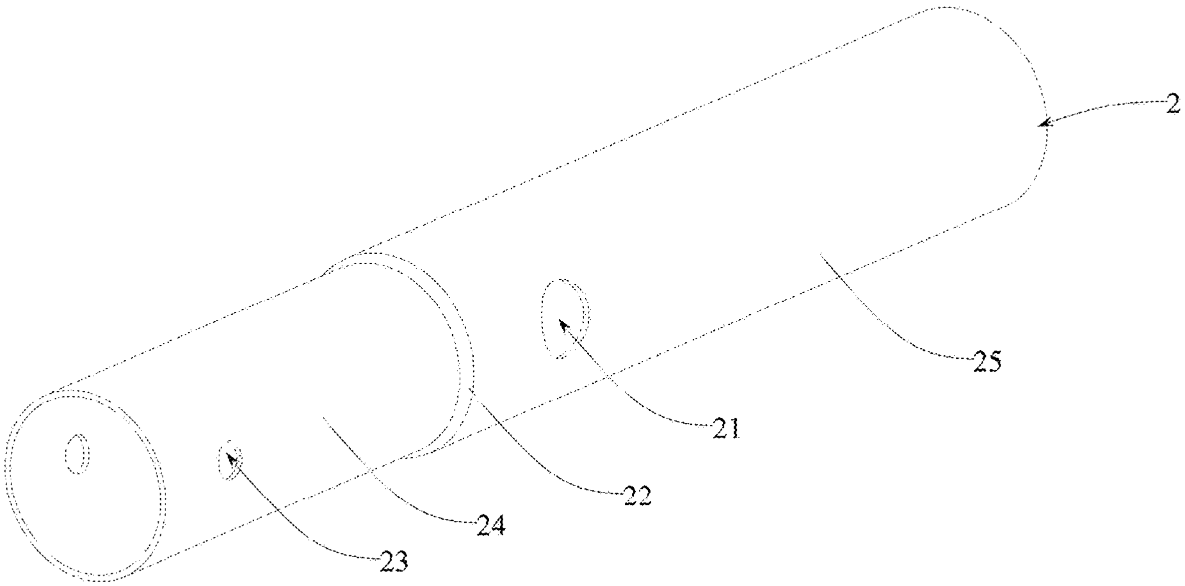
FIG. 5 is a schematic diagram of an overall structure of a second tube body shown in FIG. 1.

Referring to FIGS. 3 and 5, the second tube body 2 has a tube cavity. The second connector 32 is mounted in the tube cavity of the second tube body 2. The second connector 32 has an inner cavity. The inner wall of the inner cavity of the second connector 32 facing the lead wire 34 projects inwardly to form two rib boards 32010. A first mounting hole 3203 is formed on the inwardly facing side of one of the rib boards 32010. A second mounting hole 3204 is formed on the inwardly facing side of the other rib board 32010. The pin 35 is snap-fitted within the first mounting hole 3203 and the second mounting hole 3204 so that the pin 35 is stably mounted within the second connector 32. A second end board 32011 is disposed on the side of the second connector 32 away from the first connector 31. The inner wall of the inner cavity of the second connector 32 adjacent to the second end board 32011 projects inwardly to form one rib board 32010. A second wire-crossing hole 3201 is formed on the inwardly facing side of the second end board 32011. A first wire-crossing slot 3202 is disposed on the inwardly facing side of the rib board 32010 near the second end board 32011. The second tube body 2 also includes a fourth through hole 21. One end of the lead wire 34 is electrically connected to the pin 35, and the other end of the lead wire 34 passes through the first wire-crossing slot 3202, the second wire-crossing hole 3201 and the fourth through hole 21 in sequence and extends to the outer side of the second tube body 2 to be electrically connected to the second electrical connection seat 37.

Referring to FIGS. 1-7, the first connector 31 further includes two second through holes 3108 formed opposite to each other. A third through hole 12 is formed at the position of the first tube body 1 corresponding to the second through hole 3108. The first connector 31 is mounted inside the tube cavity of the first tube body 1 by means of a bolt (not shown in the figures) passing through the second through hole 3108 and the third through hole 12 in sequence.

The first connector 31 is mounted in the tube cavity in the middle of the first tube body 1. A first step 3106 toward the second connector 32 is disposed at the middle of the first connector 31. Because the first connector 31 is mounted in the middle of the first tube body 1, which makes installation difficult, the first step 3106 is provided with a first groove 3107 that extends in a direction from the second connector 32 so that a fixture that matches the shape of the first groove 3107 can clamp the first connector 31 through the first groove 3107, thereby making it easier to mount the first connector 31 in the middle of the first tube body 1.

Figure 7:
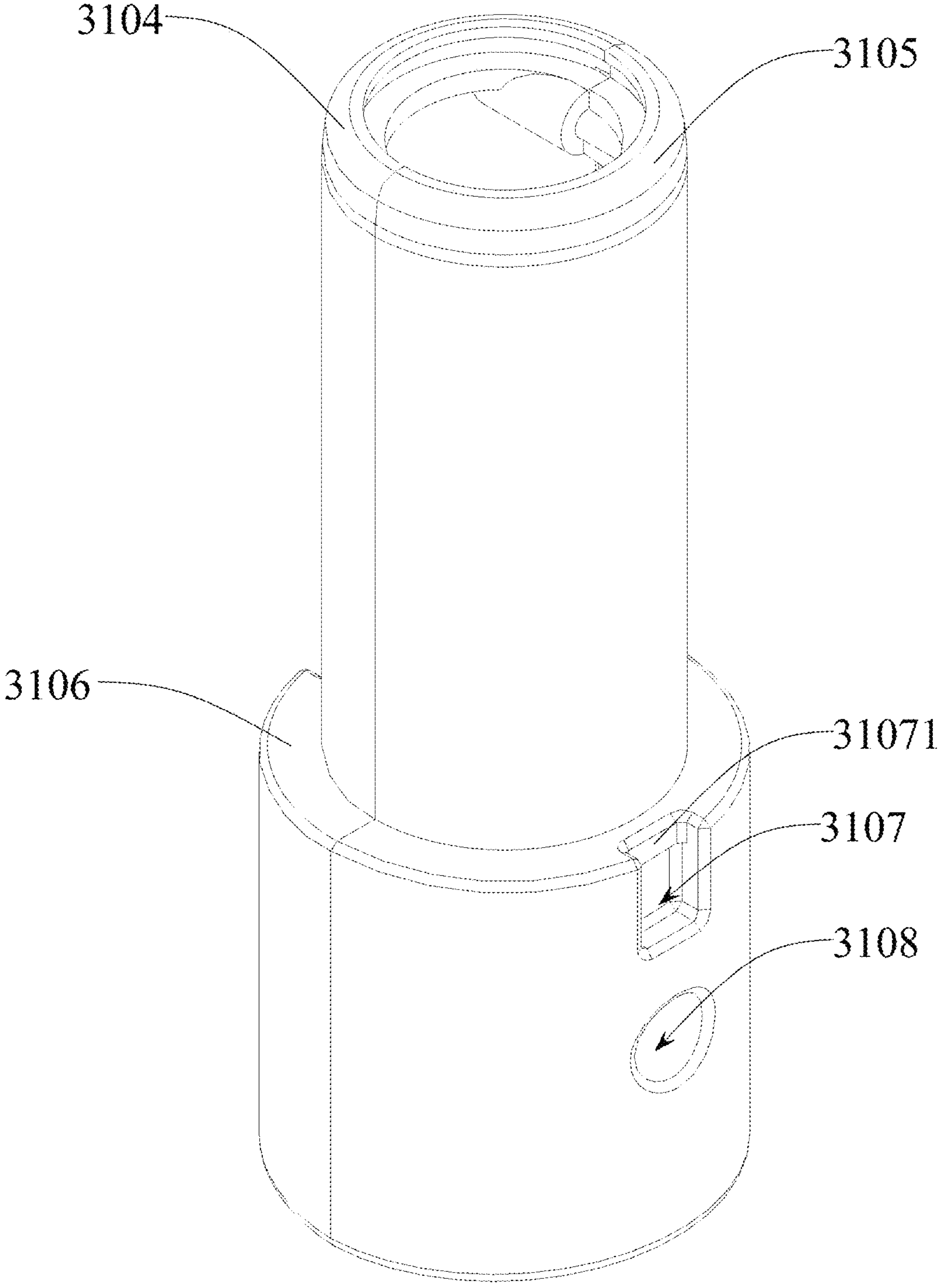
FIG. 7 is a schematic diagram of an overall structure of a first connector shown in FIG. 3.

Referring to FIG. 7, an opening is formed on the side of the first groove 3107 towards the first step 3106. The opening has a stop 31071 so that the fixture clamps the first connector 31 more stably through the first groove 3107.

Referring to FIGS. 1-7, the second connector 32 includes a first snap joint 3208. A first through hole 23 is formed at the position of the second tube body 2 corresponding to the first snap joint 3208. The first snap joint 3208 is snap-fitted within the first through hole 23 so that the second connector 32 is mounted within the tube cavity of the second tube body 2.

The first snap joint 3208 includes an elastic board 32081 and a first protrusion 32082 matching the shape of the first through hole 23 so that the second connector 32 is inserted into the second tube body 2 smoothly, during which the first protrusion 32082 is smoothly inserted into the second tube body 2 by deformation of the elastic board 32081 and guidance of the first protrusion 32082. When the first protrusion 32082 reaches the first through hole 23, the first protrusion 32082 is brought into and inserted in the first through hole 23 by the rebound of the clastic board 32081.

The second tube body 2 includes a tube body thin portion 24 facing the first tube body 1 and a tube body thick portion 25 away from the first tube body 1. When mounted, the tube body thin portion 24 is inserted into the tube cavity of the first tube body 1 so that the second tube body 2 is detachably connected to the first tube body 1.

A third step 22 is disposed between the tube body thick portion 25 and the tube body thick portion 25. When mounted, the annular shaped tube end of the first tube body 1 towards the second tube body 2 is affixed to the third step 22 so that the tree-shaped first tube body 1 and the second tube body 2 are joined almost seamlessly, thereby further improving the decorative effect of the tree-shaped light section.

A second step 3209 positioned on an outer side and an insertion hole 32012 positioned on an inner side are disposed at the end portion of the second connector 32 near the tube body thin portion 24. The second step 3209 has a projected size in an insertion direction larger than that of the tube cavity of the tube body thin portion 24 in the insertion direction so that the second step 3209 restricts the second joint 32 from being inserted into the tube cavity of the tube body thin portion 24 in entirety. Therefore, when the end of the first connector 31 on the side where the circuit board 36 is positioned passes through the insertion hole 32012 of the second connector 32 and is inserted into the inner cavity of the second connector 32 so that the circuit board 36 contacts the pin 35, the pin 35 is avoided from being pressed against the circuit board 36 under the action of the spring 352.

Figure 8:
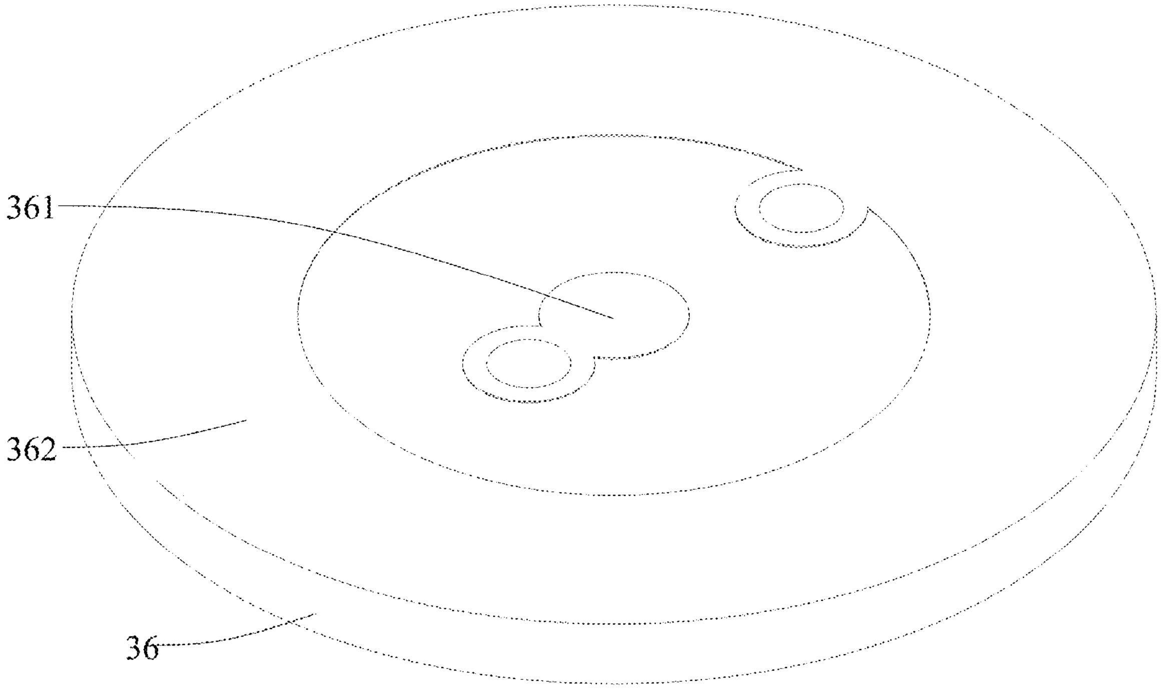
FIG. 8 is a schematic diagram of an overall structure of a circuit board shown in FIG. 3.

Referring to FIG. 8, the circuit board 36 includes a negative electrode portion 361 positioned in the center of the circular circuit board 36 and a ring-shaped positive electrode portion 362 positioned in the periphery of the circular circuit board 36. The number of the pins 35 are three. Two of the three pins 35 are pressed against the ring-shaped positive electrode portion 362 in the periphery. The remaining one of the three pins 35 is pressed against the negative electrode portion 361 in the center of the circular circuit board 36. Because the current of a positive electrode is relatively high, via the two pins 35 pressed against each other, the risk of failure and disconnection of the pins 35 are reduced, and hence is conducive to further improving the stability of the power connection.

Referring to FIGS. 1-7, the first connector 31 includes a first housing 3104, a second housing 3105, and a first connecting structure 3103 positioned between the first housing 3104 and the second housing 3105. The first housing 3104 is connected to the second housing 3105 through the first connecting structure 3103. The inner cavity of the first connector 31 is formed between the first housing 3104 and the second housing 3105.

The second connector 32 includes a third housing 3206, a fourth housing 3207, and a second connecting structure 3205 between the third housing 3206 and the fourth housing 3207. The third housing 3206 is connected to the fourth housing 3207 via the second connecting structure 3205. The inner cavity of the second connector 32 is formed between the third housing 3206 and the fourth housing 3207.

The first connecting structure 3103 and the second connecting structure 3205 have essentially the same structure, both include a connecting post and a card hole, and are snap-fitted into the card hole by the connecting post. The first housing 3104 is fixed to the second housing 3105. The third housing 3206 is fixed to the fourth housing 3207.

Figure 9:
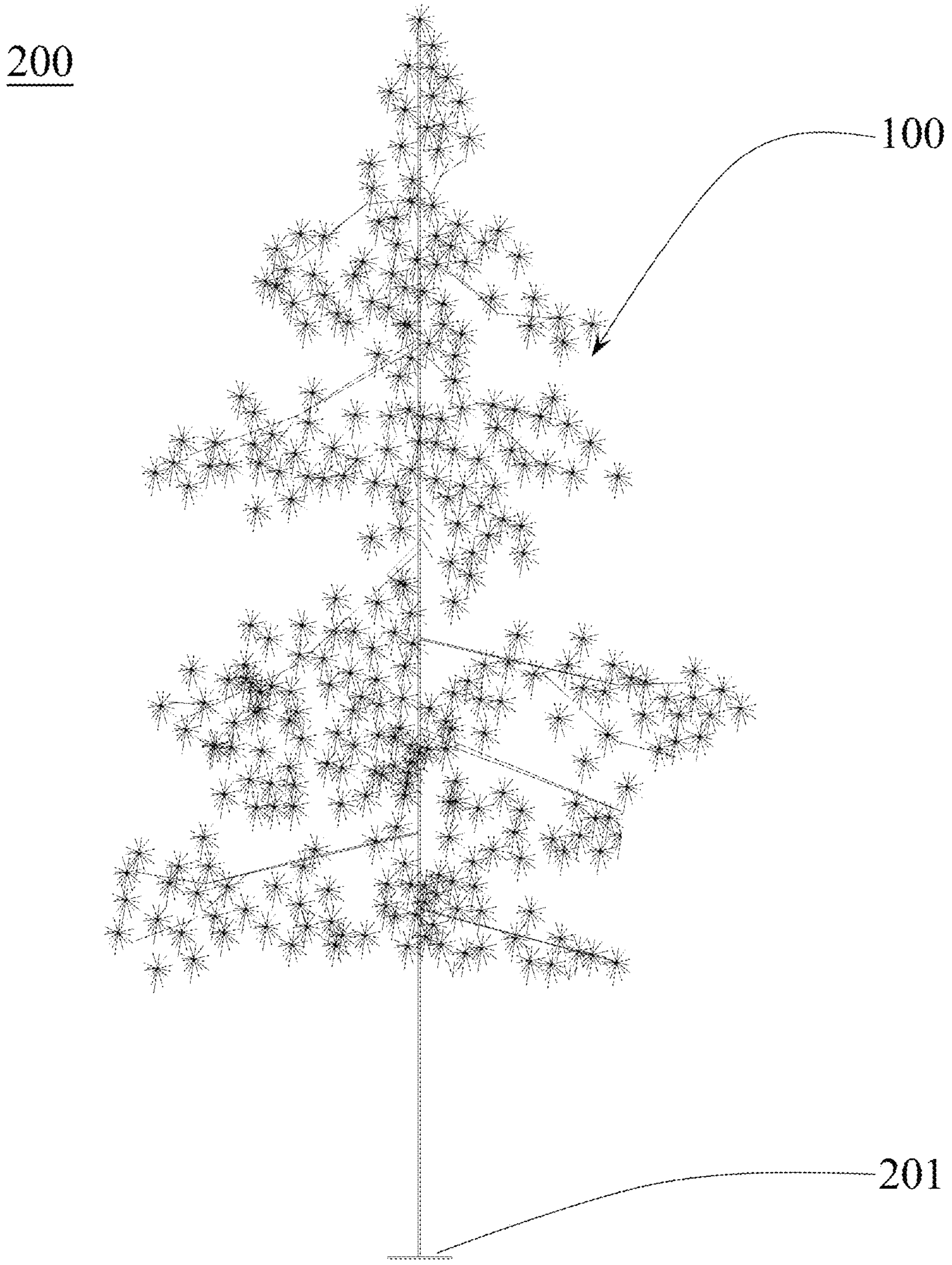
FIG. 9 is a schematic diagram of an overall structure of a tree-shaped light of one embodiment of the present invention.

Referring to FIG. 9, the present application also provides a tree-shaped light 200, including a plurality of tree-shaped light sections 100 and a base 201. The plurality of tree-shaped light sections 100 are assembled together and mounted on the base 201 to form the shape of a tree.

It is apparent to a person skilled in the art that the present application is not limited to the details of the above exemplary embodiments, and that the present application is capable of being realized in other specific forms without departing from the spirit or essential features of the present invention. Accordingly, the embodiments are to be regarded as exemplary and non-limiting in every point of view. The scope of the present application is limited by the appended claims and not by the foregoing description, and is therefore intended to encompass all variations falling within the meaning and scope of the equivalent elements of the claims. Any reference signs in the claims should not be regarded as limiting the claims to which the reference signs relate. The foregoing is only a specific embodiment of the present invention. However, the scope of protection of the present application is not limited thereto. Any changes or substitutions within the scope of the technology disclosed in the present application shall be covered by the scope of protection of the present invention. Therefore, the scope of protection of the present application shall be subject to the scope of protection of the claims.

What is claimed is:

1. A tree-shaped light section, comprising a first tube body, a second tube body, and an electrical connection assembly, wherein the electrical connection assembly comprises a pin, a circuit board, a first electrical connection seat, a second electrical connection seat, a first connector, and a second connector, wherein the first connector is mounted within one end of the first tube body, the second connector is mounted within one end of the second tube body facing the first tube body, the first connector is detachably connected to the second connector so that the first tube body is detachably connected to the second tube body, the pin is mounted in the first connector and electrically connected to the first electrical connection seat, the circuit board is mounted in the second connector and electrically connected to the second electrical connection seat, the pin has a spring, and the pin is pressed against the circuit board;

the second connector comprises a first snap joint, a first through hole is formed at a position of the second tube body corresponding to the first snap joint, and the first snap joint is snap-fitted into the first through hole so that the second connector is mounted in the second tube body.

2. The tree-shaped light section according to claim 1, wherein the first connector comprises a second through hole, a third through hole is formed at a position of the first tube body corresponding to the second through hole, the first connector is mounted in the first tube body by a bolt passing through the third through hole and the second through hole in sequence.

3. The tree-shaped light section according to claim 2, wherein a first step is disposed in a middle of the first connector, the first step has a first groove extending in a direction away from the second connector so that a fixture matching the shape of the first groove is capable of clamping the first connector through the first groove.

4. The tree-shaped light section according to claim 3, wherein an opening is formed on a side of the first groove facing the first step, and the opening has a stop position so that the fixture is capable of clamping the first connector through the first groove.

5. The tree-shaped light section according to claim 1, wherein the first snap joint comprises an elastic board and a first protrusion matching a shape of the first through hole so that the second connector is capable of being inserted into the second tube body.

6. The tree-shaped light section according to claim 3, wherein the second tube body comprises a tube body thin portion facing the first tube body and a tube body thick portion away from the first tube body, and the tube body thin portion is inserted into a tube cavity of the first tube body so that the second tube body is detachably connected to the first tube body.

7. The tree-shaped light section according to claim 6, wherein a second step is disposed at the end of the second connector near the tube body thin portion, the second step has a projected dimension in an insertion direction greater than a projected dimension of a tube cavity of the tube body thin portion in the insertion direction so that the second step restricts the second connector from being inserted into the tube cavity of the tube body thin portion in entirety.

8. The tree-shaped light section according to claim 1, wherein the first connector comprises a first housing, a second housing, and a first connecting structure positioned between the first housing and the second housing, and the first housing is connected to the second housing through the first connecting structure.

9. The tree-shaped light section according to claim 8, wherein the second connector comprises a third housing, a fourth housing, and a second connecting structure positioned between the third housing and the fourth housing, and the third housing connecting is connected to the fourth housing through the second connecting structure.

10. A tree-shaped light section, comprising a first tube body, a second tube body, and an electrical connection assembly, wherein the electrical connection assembly comprises a first electrical connection structure, a second electrical connection structure, a first electrical connection seat, a second electrical connection seat, a first connector, and a second connector, wherein the first connector is mounted within one end of the first tube body, the second connector is mounted within one end of the second tube body facing the first tube body, the first connector is detachably connected to the second connector so that the first tube body is detachably connected to the second tube body, the first electrical connection structure is mounted in the first connector and electrically connected to the first electrical connection seat, the second electrical connection structure is mounted in the second connector and electrically connected to the second electrical connection seat, the first electrical connection structure has a spring, and the first electrical connection structure is pressed against the second electrical connection structure under action of the spring;

the second connector comprises a first snap joint, a first through hole is formed at a position of the second tube body corresponding to the first snap joint, and the first snap joint is snap-fitted into the first through hole so that the second connector is mounted in the second tube body.

11. The tree-shaped light section according to claim 10, wherein the first connector comprises a second through hole, a third through hole is formed at a position of the first tube body corresponding to the second through hole, the first connector is mounted in the first tube body by means of a bolt passing through the third through hole and the second through hole in sequence.

12. The tree-shaped light section according to claim 11, wherein a first step is disposed in a middle of the first connector, the first step has a first groove extending in a direction away from the second connector so that a fixture matching a shape of the first groove is capable of clamping the first connector through the first groove.

13. The tree-shaped light section according to claim 12, wherein an opening is formed on a side of the first groove facing the first step, and the opening has a stop so that the fixture is capable of clamping the first connector through the first groove.

14. The tree-shaped light section according to claim 10, wherein the first snap joint comprises an elastic board and a first protrusion matching a shape of the first through hole so that the second connector is capable of being inserted into the second tube body.

15. The tree-shaped light section according to claim 12, wherein the second tube body comprises a tube body thin portion facing the first tube body and a tube body thick portion away from the first tube body, and the tube body thin portion is inserted into a tube cavity of the first tube body so that the second tube body is detachably connected to the first tube body.

16. The tree-shaped light section according to claim 15, wherein a second step is disposed at athe end of the second connector near the tube body thin portion, the second step has a projected dimension in an insertion direction greater than that of a tube cavity of the tube body thin portion in the insertion direction so that the second step restricts the second connector from being inserted into the tube cavity of the tube body thin portion in entirety.

17. The tree-shaped light section according to claim 10, wherein the first connector comprises a first housing, a second housing, and a first connecting structure positioned between the first housing and the second housing, and the first housing is connected to the second housing through the first connecting structure.

18. A tree-shaped light, comprising at least one tree-shaped light section and a base, wherein the tree-shaped light section is mounted on the base after being assembled; the tree-shaped light section comprises a first tube body, a second tube body, and an electrical connection assembly; the electrical connection assembly comprises a first electrical connection structure, a second electrical connection structure, a first electrical connection seat, a second electrical connection seat, a first connector, and a second connector, the first connector is mounted within one end of the first tube body, the second connector is mounted within one end of the second tube body facing the first tube body, the first connector is detachably connected to the second connector so that the first tube body is detachably connected to the second tube body, the first electrical connection structure is mounted in the first connector and electrically connected to the first electrical connection seat, the second electrical connection structure is mounted in the second connector and electrically connected to the second electrical connection seat, the first electrical connection structure has a spring, and the first electrical connection structure is pressed against the second electrical connection structure under action of the spring;

the second connector comprises a first snap joint, a first through hole is formed at a position of the second tube body corresponding to the first snap joint, and the first snap joint is snap-fitted into the first through hole so that the second connector is mounted in the second tube body.

* * * * *